United States Patent [19]

Lilley et al.

[11] Patent Number: 4,505,153

[45] Date of Patent: Mar. 19, 1985

[54] RECOIL TRANSDUCER FIXTURE

[75] Inventors: Jay S. Lilley; Jerrold H. Arszman, both of Huntsville, Ala.

[73] Assignee: The United States of America as represented by the Secretary of the Army, Washington, D.C.

[21] Appl. No.: 502,907

[22] Filed: Jun. 10, 1983

[51] Int. Cl.³ .............................................. G01L 5/14
[52] U.S. Cl. ...................... 73/117.4; 73/167; 73/862.68
[58] Field of Search ........... 73/11, 167, 117.4, 862.68, 73/DIG. 4; 310/338

[56] References Cited

U.S. PATENT DOCUMENTS 3,213,680 10/1965 Schaefer .................. 73/117.4 X
3,258,959 7/1966 Deegan .................... 73/117.4
3,430,487 3/1969 Thorsted et al. .......... 73/117.4
3,464,503 9/1969 Houck ..................... 73/11 X

FOREIGN PATENT DOCUMENTS 621027 1/1927 France ..................... 73/DIG. 4

Primary Examiner—Charles A. Ruehl
Attorney, Agent, or Firm—Anthony T. Lane; Robert P. Gibson; Harold W. Hilton

[57] ABSTRACT

A recoil transducer fixture for determining force responses at high frequencies. An impact transducer is mounted in a rigid assembly and is preloaded for operating under compressive loads. The fixture includes a pair of spaced plates having the transducer mounted therebetween and loading bolts cooperating with the plates for preloading the transducer to a predetermined value.

1 Claim, 2 Drawing Figures

RECOIL TRANSDUCER FIXTURE

DEDICATORY CLAUSE

The invention described herein may be manufactured, used, and licensed by or for the Government for governmental purposes without the payment to us of any royalties thereon.

BACKGROUND OF THE INVENTION

Typically, in solid rocket research, strain gages are used to determine forces. However, a unique situation arises in the development of recoilless, projectile launch systems. The systems as designed produce very low average recoil. However, the components of this small recoil are very large positive and negative forces (>2000 lbs) acting over very short times (45 ms). In order to understand recoil in sufficient depth to analyze and control it, the forces acting over the very short times must be understood and modeled. Experimental data are necessary to support the analysis and modeling. A very high frequency response recoil measurement system is required to provide adequate data resolution. To achieve this very high frequency response all components of the recoil stand must be very stiff (i.e. very high spring constant). The components include the force transducer and the mounting/interface mechanism.

The system presented here is designed to determine force responses at high frequency. The transducer used is an impact device which is very stiff and which results in a frequency response of 30 Khz. The transducer is mounted in a very stiff stainless steel fixture. The transducer will only operate under compressive loads and thus it must be preloaded. The preloading is accomplished by stiff stainless steel bolts. This very stiff system provides an overall frequency response much higher than the frequency range of the recoil-thrust response. Thus this system can be used to determine the recoil-thrust response of the propulsion system.

This transducer fixture can be employed to determine thrust and or recoil for any propulsion system in which high thrust, short duration, events occur.

SUMMARY OF THE INVENTION

A recoil transducer fixture for determining force responses at high frequencies. The structure includes a fixture having an impact transducer mounted therein. The fixture includes a loading plate and a base plate having the transducer mounted thereon between the loading plate and base plate. A plurality of loading bolts is secured between the loading plate and base plate to preload the transducer to a predetermined value.

DESCRIPTION OF THE PREFERRED EMBODIMENT

Figure 1:
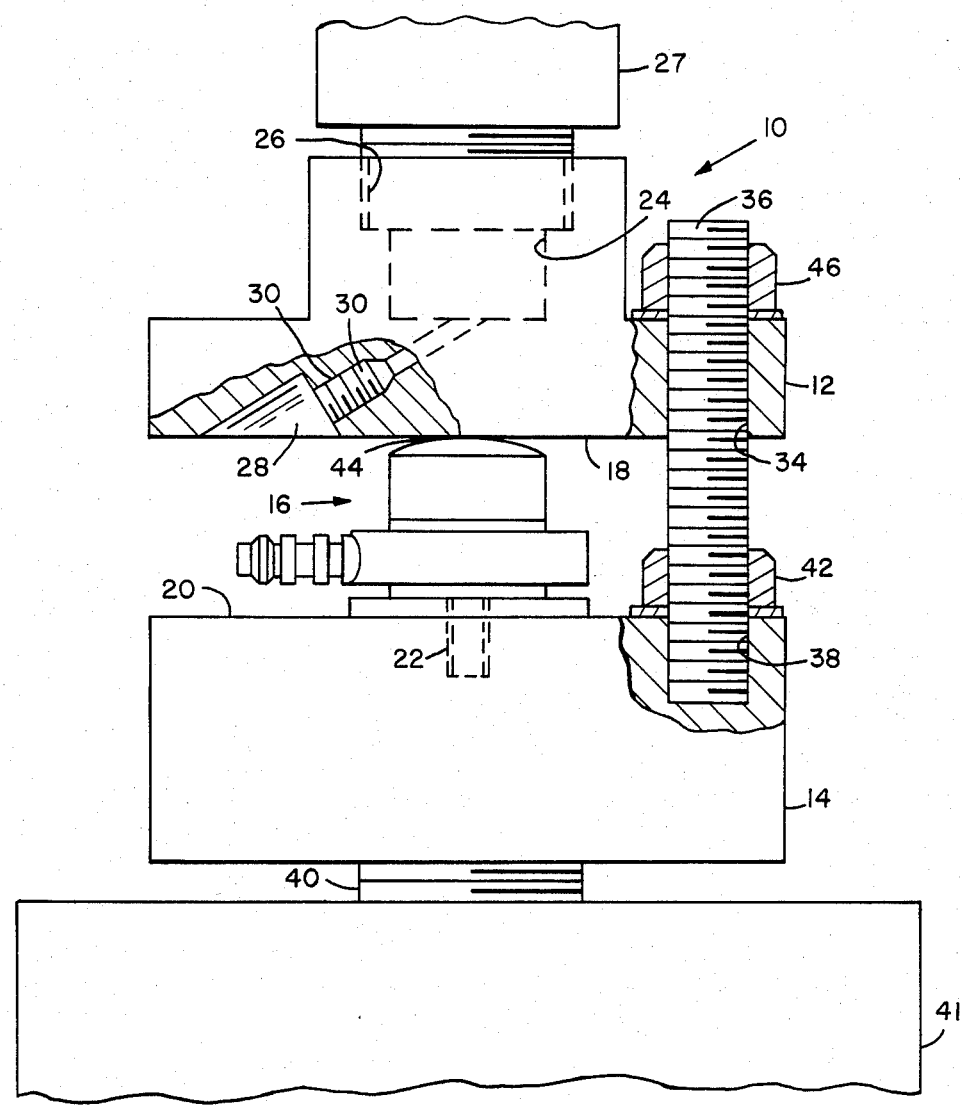
FIG. 1 is an elevational view, partially in section, of the recoil fixture of the present invention having a transducer mounted therein.

As seen in the Figure, a recoil fixture 10 includes a loading plate 12 and a base plate 14 disposed in spaced relation. An impact transducer assembly 16 is disposed intermediate lower surface 18 and upper surface 20 of plates 12 and 14, respectively. Assembly 16 is mounted on base plate 14 by a mounting stud 22.

Loading plate 12 is provided with a cavity 24 having an upper internally threaded portion 26 for receiving the propulsion device 27 to be tested. The loading plate 12 may include a passage 28 to receive igniter leads which are disposed for igniting the propulsive device secured in cavity 24. Threads 30 disposed on a threaded collar 32 and loading plate 12 seal the igniter cavity 24. The igniter leads pass through passage 28 and collar 32 to the propulsive device to be tested. Loading plate 12 further includes a plurality of openings 34 (typically, three openings spaced 120° apart) to receive preload bolts 36 therein.

Base plate 14, similarly, is provided with openings 38 which are threaded to receive the preload bolts 36 therein. Base plate 14 further includes a mounting stud 40 for assemblying the recoil fixture to a test stand 41.

The recoil transducer fixture is assembled by first screwing mounting stud 22, which is affixed to transducer assembly 16, into base plate 14. Preload bolts 36 are then screwed in base plate 14 and are secured therein by locking nuts 42. Loading plate 12 is then lowered onto transducer assembly 16 with contact being made at mating surface 44 of the transducer and lower surface 18 of upper plate 12. The preload bolts pass through openings 34 of loading plate 12 and a preload is placed on the transducer 16 by torquing preload nuts 46 which have internal threads to receive the preload bolts in threaded relation. The preload nuts 46 are torqued evenly to provide the predetermined preload to the impact transducer 16. The preload is necessary to measure both positive and negative recoil. The entire fixture is mounted to the test stand 41 with mounting stud 40.

The propulsion device to be tested is attached to the recoil fixture 10 by mounting threads 26. The device is activated by an igniter charge placed in cavity 24. The current to initiate the igniter is supplied by igniter leads which enter the igniter cavity 24 through passage 28.

A typical transducer used in the fixture of the present invention may be similar to that manufactured by PCB Piezotionics, Buffalo, New York. This transducer is hermetically sealed and includes a quartz element and proper circuitry. Precision mounting surfaces are provided for mating with adjacent structure through which the forces are transmitted. An output voltage is provided which can be read out on oscilloscopes, recorders, digital voltmeters, peak meters, etc. Such a transducer is described in an information bulletin published by PCB Piezotionics and entitled "Transducer Instrumentation" which describes a quartz force ring, model 201A, with built-in amplifier.

Figure 2:
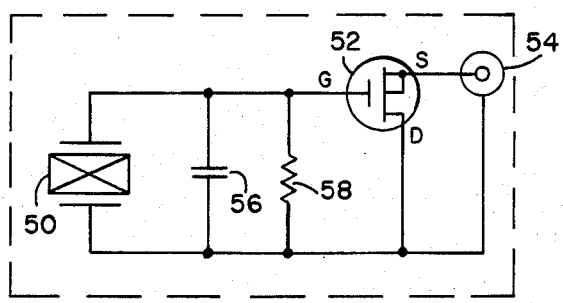
FIG. 2 is a schematic illustration of a transducer that may be used with the fixture of the present invention.

Such structure is shown in FIG. 2 wherein the high impedance voltage from a quartz element 50 is fed to a microminiature MOFET input source follower 52 built into the connector. The amplifier reduces the output impedance to less than 100 ohms and provides an output voltage. Both power and output are conducted over a single coaxial cable 54 with the cable shield providing the ground return. FIG. 2 depicts a typical voltage mode quartz transducer.

When the source terminal of the ICP (Integrating Circuit Piezoelectric) amplifier 52 is supplied with 2 to 20 mA constant current from a +18 to 24 VDC supply, the amplifier bias at the source will be +11 volts (nominal) and is independent of supply current or voltage. The signal from the quartz element 50 is superimposed on this bias voltage. A ranging capacitor 56 and bias resistor 58 are provided for tuning.

While the fixture of the present invention has been described in conjunction with the particular transducer described, supra. It is to be understood that other transducers may be used.

We claim:

1. A recoil fixture for determining force responses in a propulsion device at high frequency comprising:
   a. a pair of plates including a loading plate and a base plate disposed in spaced relation, said loading plate adapted to receive said propulsion device whose force responses are to be determined;
   b. an impact transducer rigidly mounted between said loading plate and said base plate;
   c. means for preloading said impact transducer to a predetermined value, said means including studs secured in threaded relation in said base plates, said studs extending through said loading plate, and loading nuts in engagement with said loading plate and disposed in threaded relation with said studs, said studs being spaced 120° apart in said fixture;
   d. a first mounting stud secured to said transducer and disposed for secured relation in said base plate to secure said transducer thereto;
   e. said loading plate being provided with a cavity to receive said propulsion device therein and a passage to receive igniter leads therein, said igniter leads disposed for ignition of said propulsion device; and,
   f. a second mounting stud, said second mounting stud secured to said base plate and disposed for secured relation to a test stand.

* * * * *